United States Patent [19]
Suzuki et al.

[11] Patent Number: 6,157,112
[45] Date of Patent: *Dec. 5, 2000

[54] BRUSHLESS DC MOTOR STRUCTURE

[75] Inventors: Yuzuru Suzuki; Taketoshi Ohyashiki; Naoyuki Harada; Taichi Nishio, all of Shizuoka-ken, Japan

[73] Assignee: Minebea Co., Ltd., Kitasaku, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/187,745

[22] Filed: Nov. 9, 1998

[30] Foreign Application Priority Data

Nov. 10, 1997 [JP] Japan ................................ 9-306771

[51] Int. Cl.⁷ ............................ H02K 1/24; H02K 15/00; H02K 1/18; H02K 1/12; H02K 1/00
[52] U.S. Cl. ........................... 310/269; 310/128; 310/259; 310/67 R; 310/216; 310/156; 310/254; 310/42; 310/179; 310/261
[58] Field of Search ..................... 310/268, 259, 310/67 R, 216, 156, 254, 42, 218, 269, 153, 157, 179, 261, 265

[56] References Cited

U.S. PATENT DOCUMENTS

| | | | |
|---|---|---|---|
| 3,806,785 | 4/1974 | DeValroger et al. | 318/254 |
| 3,859,548 | 1/1975 | Morley et al. | 310/42 |
| 4,529,900 | 7/1985 | Uzuka | 310/43 |
| 4,639,648 | 1/1987 | Sakamoto | 318/254 |
| 4,851,731 | 7/1989 | Saotome et al. | 310/258 |
| 5,214,337 | 5/1993 | Ishibashi | 310/268 |
| 5,402,028 | 3/1995 | Koeber et al. | 310/259 |
| 5,493,161 | 2/1996 | Uno et al. | 310/156 |
| 5,701,047 | 12/1997 | Johnson | 310/254 |

*Primary Examiner*—Nick Ponomarenko
*Assistant Examiner*—Guillermo Perez
*Attorney, Agent, or Firm*—Staas & Halsey LLP

[57] ABSTRACT

A brushless DC motor, having a rotor with a cylindrical rotor magnet supported rotationally by a shaft held by bearings mounted on a substantially planar base plate, and a stator supported by the base plate, and including a plurality of radially spaced salient poles holding stator coils formed by windings of magnet wire. Opposing surfaces of the rotor and each salient pole are defined by a first surface of a magnetic core of the salient pole, which is received in a bobbin, and a second surface of the magnetic core orthogonal to the first surface, and the rotor magnet has permanent magnet poles forming a first surface opposing the first surface of the magnetic core, and a second surface opposing the second surface of the magnetic core. A tip of each magnetic core is received through a hole formed in the base plate.

9 Claims, 5 Drawing Sheets

W = (0.4 ~ 0.7)P

BRUSHLESS DC MOTOR STRUCTURE

BACKGROUND OF THE INVENTION

1, Field of the Invention

The present invention relates to a brushless DC motor structure and more particularly to a motor with an improved structure for a permanent magnet wound by a feeder coil and a fixed magnet bobbin.

2, Description of the Prior Art

Recently, in order to provide more functional equipment at lower cost, it has become normal to use the sectional drive method, in which a single equipment uses a plurality of dedicated motors, each serving a particular function. Particularly, in the case of small DC motors, light weight, enhanced magnetic circuit efficiency giving better motor efficiency to respond to required applications, diminished cogging torque and electromagnetic noise, and superior controllability are desired. Measures adopted so far to meet these demands include increasing the number of slots of the core, and increasing the number of poles of the magnet in order to improve the electromagnetic efficiency by shortening each magnetic circuit. Further, the winding efficiency of the coil is increased by using concentrated winding on a single salient pole, and at the same time, by using a powerful samarium-cobalt magnet as the permanent magnet.

The customary structure, used for the design of cores for brushless DC motors having cores laminated in the direction of the rotor shaft, has slots to hold the coils and yoke sections to form the magnetic paths (in a concentrated winding, the sections, hereafter called salient poles, which oppose the magnet acting through the medium of the air gap). Thin cores are laminated in multiple layers, insulation is applied to the necessary parts of the slots of the cores, and the coils are wound to form the armature. The feature of this construction is that each core is electrically insulated and iron loss is comparatively small.

However, with a laminated structure, if the number of salient poles of the core and the number of magnetic poles of the magnet are increased, the reduction in space between windings tends to cause a significant reduction in motor efficiency. Also, unless the size of the motor is increased, it is not possible to achieve the required volume of winding, and so a permanent magnet with high magnetic characteristics is employed to achieve the desired motor characteristics, despite the hi-her costs that result.

The present invention has been accomplished in view of the above-mentioned problems and it is an object of the invention to provide a brushless DC motor construction which is highly functional, generates little electromagnetic noise, uses an inexpensive magnet and does not employ a laminated structure stacked in the direction of the rotor shaft.

SUMMARY OF THE INVENTION

In order to achieve the above-mentioned objects, the present invention provides a brushless DC motor structure having a rotor with a rotor magnet supported rotationally by bearings mounted on the base plate and, arranged around the outside of the said rotor, a stator formed from a plurality of salient poles holding stator coils formed by windings of magnet wire, and in this motor, the opposing surfaces of the rotor and each salient pole are established by the cylindrical surface of the inside of the core of the rotor shaft and the surface orthogonal to the rotor shaft core, in addition, the above rotor magnet has permanent magnet poles forming the surface opposing the cylindrical surface of the inside of the rotor shaft core and the surface opposing the surface orthogonal to the rotor shaft core.

Another embodiment further provides the brushless DC motor structure in which a base plate is formed from a soft magnetic material, and in addition, having has the tips of the magnetic core fixed in such a way as to form a magnetic circuit with this base plate.

Another embodiment further provides the brushless DC motor structure in which holes are formed in the base plate for insertion of the salient poles, and in addition, the tips of the salient poles are punched to prevent them from passing too far into these holes.

Another embodiment further provides a brushless DC motor structure which has the plane of the fixed position of the salient poles, fixed on the base plate orthogonally to the rotor shaft core, and determined by the height of the magnet wire wound on the bobbins.

Another embodiment further provides the brushless DC motor structure in which the tip of the rotor shaft forms the rotor projecting above the plane of the uppermost surface of the turntable of the rotor.

Another embodiment further provides the brushless DC motor structure in which a relationship between the thickness of the salient pole laminations W and the pole pitch P of the circumferential rotor magnets of $W=(0.4$ to $0.7) P$.

Another embodiment further provides the brushless DC motor structure in which the length of the tip of the above mentioned salient pole which lies in a parallel plane to the rotor shaft core, is shorter than that of the permanent magnet in opposition to it.

Another embodiment further provides the brushless DC motor structure in which the surface of each salient pole opposing the rotor shaft core lies at an angle to the two planes composed of the cylindrical plane at the heart of the rotor shaft core and the horizontal plane orthogonal to the rotor shaft core.

Another embodiment further provides the brushless DC motor structure in which the gaps between the salient poles fixed to the base plate are protected by a cover which prevents dust and foreign objects from entering the rotor magnet.

DESCRIPTION OF THE PREFERRED EMBODIMENTS

Embodiments of the present invention will be described in detail below with reference to the accompanying drawings.

Figure 1:
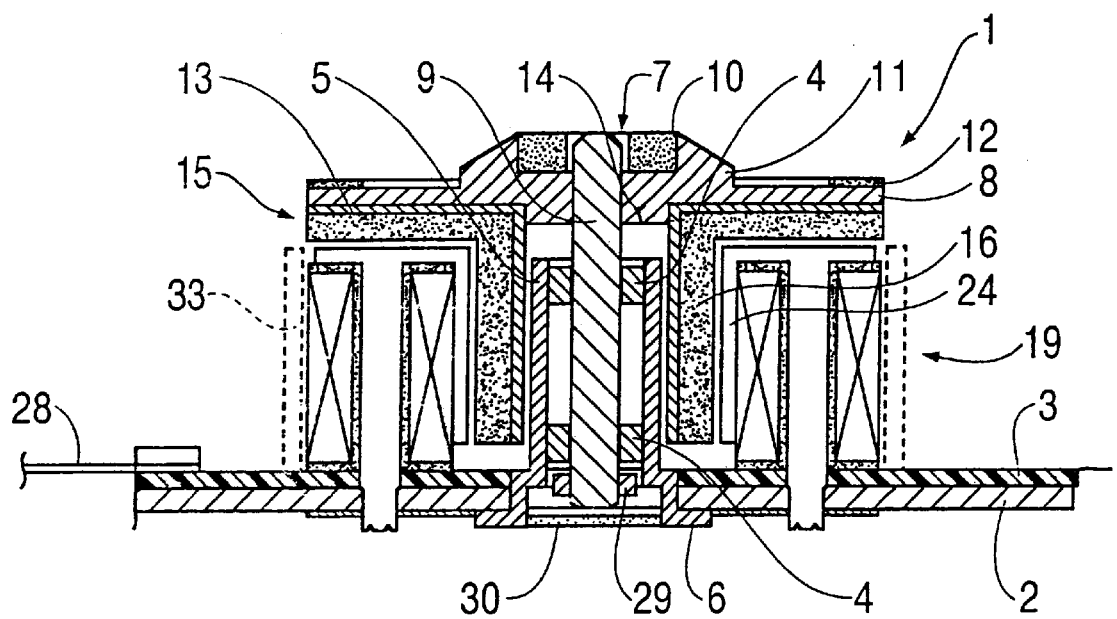
FIG. 1 is a sectional view showing an embodiment of the present invention.

FIG. 1 is a sectional view illustrating a motor structure according to an embodiment of the present invention. As shown in FIG. 1, the motor 1 is mounted upon a base plate 2 including a thin plate of soft magnetic metal. The wiring-base plate 3, holding the wiring for the stator coil (described below) and the power supply wiring, is affixed to the upper surface of base plate 2. In the center of base plate 2 is fixed the metal bearing 4, and the flange 6 of the housing S fixed to the inside of plates 2, 3. Number 7 denotes the rotor. The rotor 7 is fitted with a magnetic disk which is rotated by the turntable 8. The top of the rotor shaft 9 is fixed to the center of the turntable 8. From the center of turntable 8 projects the clamp cap 11 which receives the clamp magnet 10. The head of rotor shaft 9 lies in the same plane as, or projects above, the top surface of clamp cap 11, the reason for which is explained below.

Figure 2:
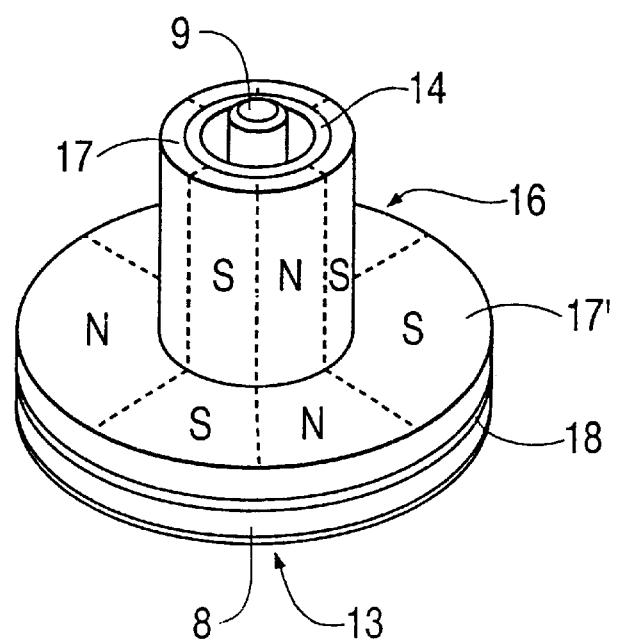
FIG. 2 is a perspective view of the rotor.

The metal bearing 4 is fixed to the inside of the housing 5 and supports the rotor shaft 9 rotatably. The table rubber 12 is fixed to the upper surface of the turntable 8 to prevent racing of the magnetic disk. The rotor 7 has a rotor yoke 15, including a flat section 13 in line with the lower surface of turntable 8 and a neck 14 suspended coaxially with the housing 5 from the vicinity of the central part of the flat section 13. In line with the outside of this rotor yoke 15 is rotor magnet 16, composed of a permanent magnet. As illustrated by FIG. 2, the rotor magnet 16 including a circumferential magnet 17 and an axial magnet 17', with the neck 14 and a yoke 18 made from soft magnetic material.

Figure 3:
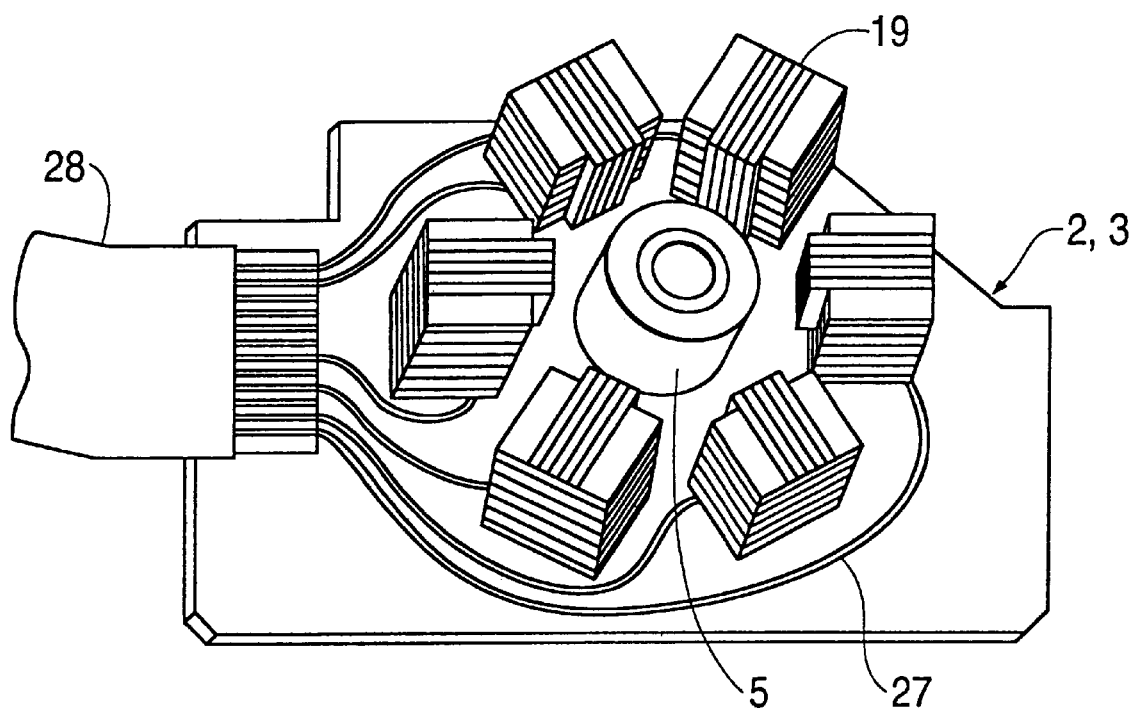
FIG. 3 is a perspective view of the stator.
Figure 4:
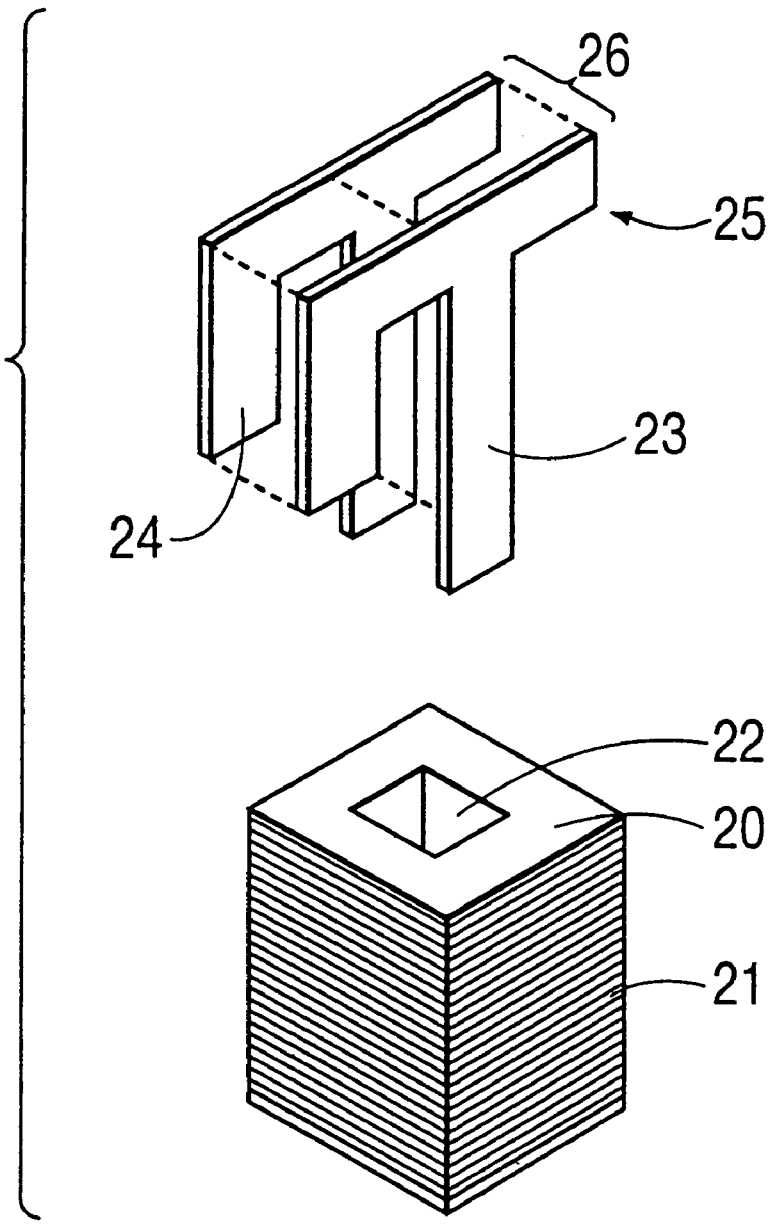
FIG. 4 is an exploded perspective view of the stator assembly.

As illustrated by FIG. 3, the six stator assemblies 19 which form the stator are mounted upon the upper surface of the layered structure formed by the base plate 2 and the wiring base plate 3, and are arranged with equal gaps between them around the centrally placed housing 5. As illustrated by FIG. 4, each stator assembly 19 includes a bobbin 20 made of electrical insulating material around which is wound the stator coil 21 of magnet wire, a magnetic core 23 which is inserted through the insertion hole 22 in the center of the bobbin 20, and a laminated assembly 26 of magnetic core plates 25 holding the salient poles 24 in opposition to the rotor magnets 16. As illustrated by FIG. 3, these stator coils 21 are connected by printed wiring 27 on wiring base plate 3 to the external flexible flat cable 28.

Into the lower end of rotor shaft 9, which is supported rotatively by the metal bearings 4, 4, there is driven in from below a stop ring 29 which prevents the rotor shaft 9 from slipping off the bearings 4, 4. A jig is used when driving the stop ring 29 into the lower end of rotor shaft 9, but since the head of rotor shaft 9 is either flush with the upper surface of clamp cap 11 or projects above it, during the driving process excessive power is not applied to turntable 8 of rotor 7 or to permanent magnet 17, etc. and so no damage will occur to rotor 7. The spaces between metal bearings 4, 4 on the inside of the housing 5 are filled with felt metal saturated with lubricant. This ensures the long term lubrication function of the space between the metal bearings and the rotor shaft. Number 30 shown in FIG. 1 is a plastic stop plate designed to prevent the leakage of lubrication and the entrance of dust, and to fix the turntable 8 in position.

Although it is not shown in the diagrams, in this way in the motor structure of the present invention an AC exciter voltage can be applied from an external switch circuit through the flexible flat cable 28 to the stator coil 21, generating a rotating magnetic field in the stator assemblies 19 and the salient poles 24 which causes the rotor 7 to rotate.

Figure 5:
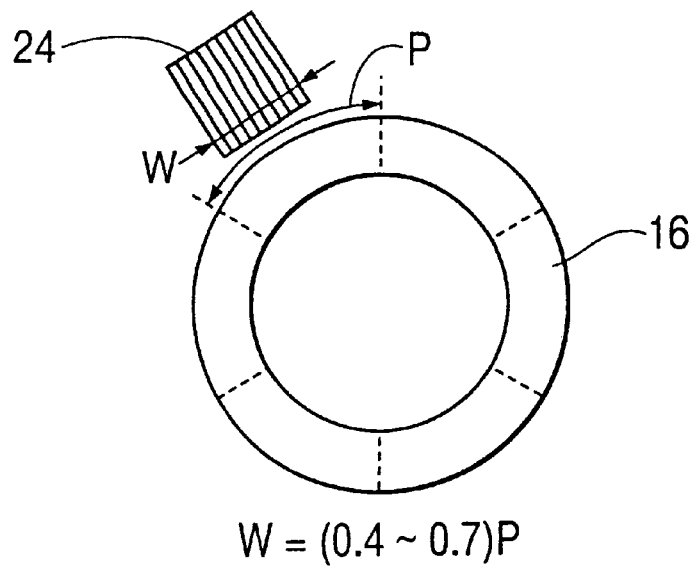
FIG. 5 is a sectional view showing the relative positions of the salient pole and permanent magnet.

In a more detailed explanation of the DC brushless motor structure of the present invention, first, as shown in FIG. 5, if P is taken as the magnetic pole pitch (length of the rotational circumference) of the rotor magnets 16 which form the rotor 7, and W is taken as the width of the salient pole 24 of the stator assembly 19 which is in opposition to the above mentioned P, then if the magnetic pitch P of the rotor magnet 16 is made a certain amount greater than the width W of the salient pole 24, the cogging will be greatly reduced. Within the range W=(0.4 to 0.7) P, the generated rotating magnetic field is smoothly absorbed by rotor magnet 16 and practically no cogging will occur.

Figure 6:
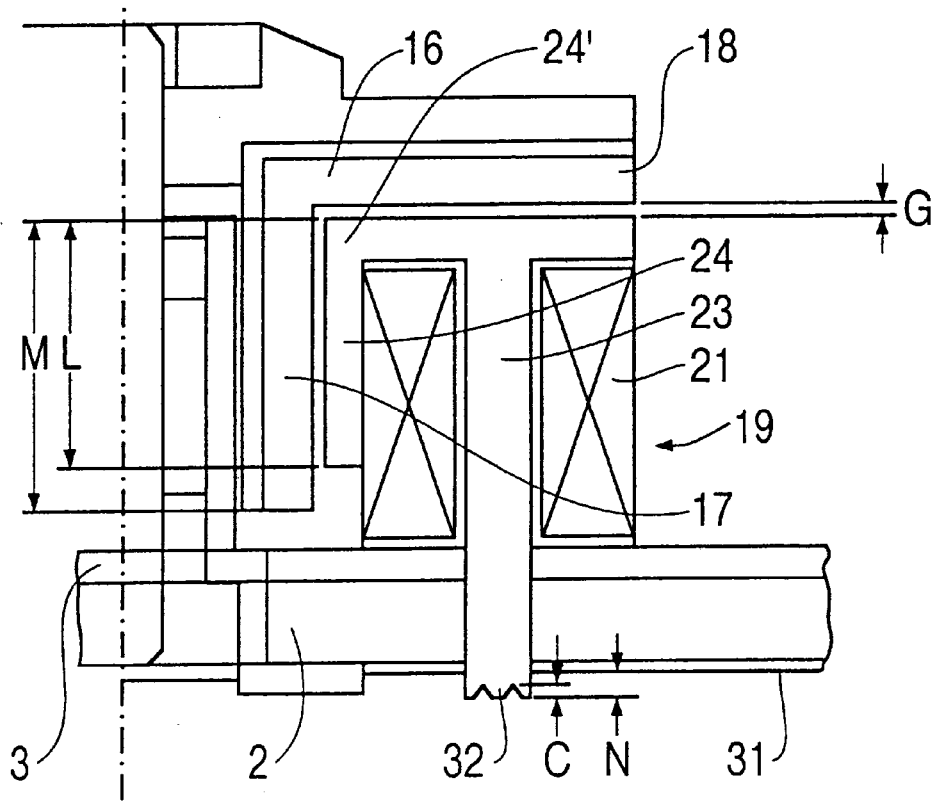
FIG. 6 is a partial sectional view showing an enlarged detail of the relative positions of the salient pole and permanent magnet.

Next, as illustrated by FIG. 6, for the present invention, if L is taken as the length of the salient pole 24 in the long direction of the rotor shaft 9, and if M is taken as the length in the same direction of circumferential magnet 17 between the tip and the shoulder 24' of the salient pole, then M>L. Because permanent magnet 17 and salient pole 24 are arranged in this structure, the present invention effectively employs the magnetic flux generated by the rotor and stator, and also reduces the leakage flux.

Furthermore, in the present invention, as illustrated by FIG. 6, the tips of the magnetic cores 23 pass through the holes opened in base plate 2, further pass through the holding plate 31 made from soft magnetic material and are affixed to the underside of base plate 2, where the tips are punched to make a split 32 which firmly fixes the stator assembly 19 to the base plate 2. In the present invention, the depth C of the split 32 is made to be less than a dimension N from the tip of the magnetic core 23 to the underside of holding plate 31. This structure enables a smooth connection between the base plate 2 and the magnetic core, increases the area of the surfaces in contact and greatly reduces the magnetic reluctance between them.

Figure 7:
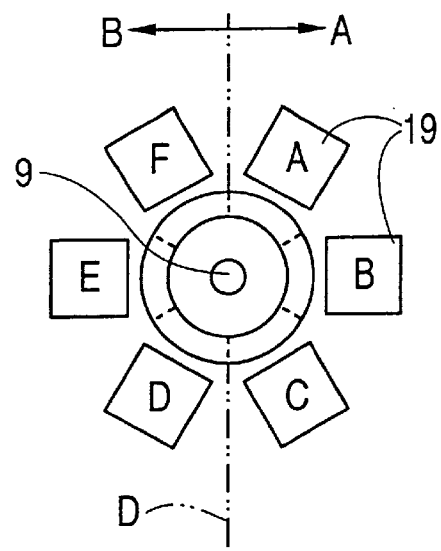
FIG. 7 is a schematic view showing the inclined action of the rotor shaft.

Further, as illustrated by FIG. 6, if the gap between the axial magnet 17' and the tip of salient pole 24 is taken to be G, then, as shown in FIG. 7, for example, in the six stator assemblies 19 arranged with the rotor shaft 9 as the center, if the gaps G between the stator assemblies 19 on the A side of the dividing line D are made smaller than the same gaps G on the B side of the dividing line, then during operation a force will act upon the rotor shaft 9 causing it to be pulled toward side A. Therefore, in order to ensure stable rotation of rotor shaft 9 with no rattling, the upper end of rotor shaft 9 is made to strongly contact the upper side of bearing metal 4, while the lower end of rotor shaft 9 is made to strongly contact the lower side of bearing metal 4, thus creating a mutual opposition to the line of the rotation axis. And rotor shaft 9 will be rotated with stability.

The above embodiment uses an inner rotor type and therefore, because of the large gaps between each stator assembly 19, there is a danger of dust or other foreign objects entering the rotor magnet. To prevent this, as shown in dotted lines in FIG. 1, a cylindrical dust cover 33 is fitted either around the outside of stator assemblies 19, or on the inside (not shown).

Figure 8:
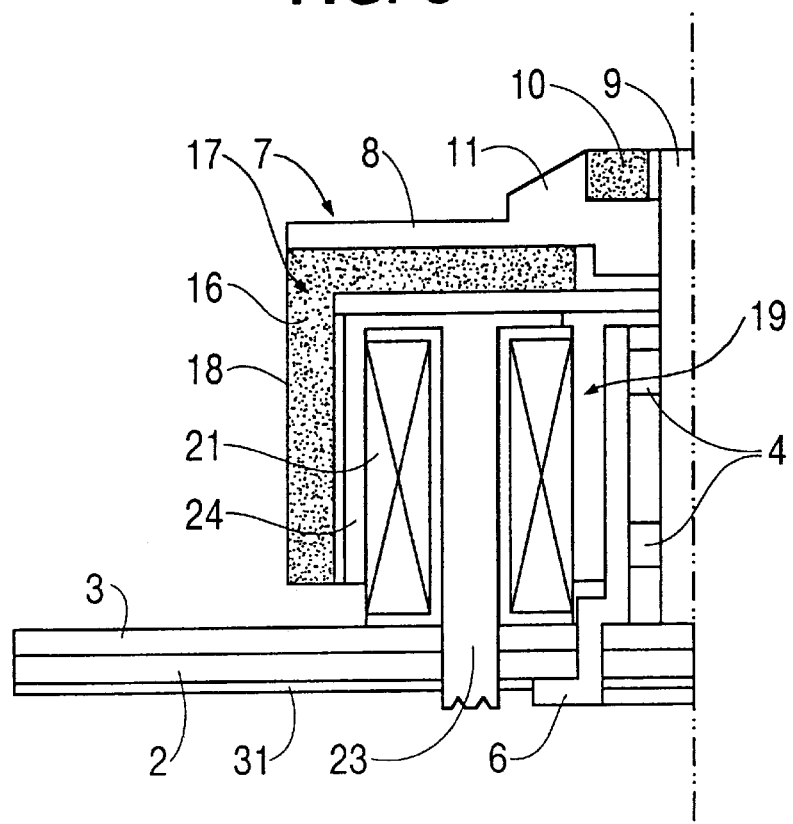
FIG. 8 is a partial sectional view showing a further embodiment of the present invention.

The present invention can also be used in a different embodiment to the above, for an outer rotor type motor structure. In this case, the structure illustrated by FIG. 8 may be used, in which the salient poles 24 of the stator assemblies 19 are on the outer side, and the rotor 7 takes the form of a cap on the inside of which the rotor magnet 16 and yoke 18 are arranged.

The present invention has been described in terms of the above embodiments, but within the range of the gist of this invention various formats and applications are possible. For example, using the outer rotor type motor shown in FIG. 8, in the same way as for the inner rotor type motor, under the conditions W=(0.4 to 0.7) P, M>L, and N>C, by using the positioning of the stator assemblies to change the gap G between the salient poles and the rotor magnet, and by inclining the axis of rotation, etc., the structure may be employed freely for a variety of formats, and these formats and applications are not excluded from the scope of the present invention.

As explained in detail above, the present invention can be used to greatly increase the area in opposition between rotor and stator, thus allowing the use of inexpensive ferrite magnets instead of expensive rare-earth magnets.

In another embodiment, the base plate is used as a yoke to create a simpler brushless DC motor structure.

In another invention, the split used as a stopper is shallow, and therefore the magnetic reluctance of the joint between salient pole and base plate can be made small.

In another embodiment, the bobbin can be used as a spacer to determine the position of the salient poles, thus simplifying the shape of the salient poles and allowing the use of inexpensive molds to form them, and therefore lowering the cost of manufacturing a DC brushless motor.

In another embodiment, when the rotor and stator are assembled, the stop ring is driven on from the bottom end of the rotor, but, since the upper tip of the rotor shaft is in the same plane or projects above the uppermost surface of the turntable, the force used in this operation is not applied to the turntable or the magnet and no damage will be caused to the rotor during assembly.

In another embodiment, the optimum ratio is achieved between the salient pole width and the pole pitch of the permanent magnets, so the transfer of the rotating magnetic field can be made smooth and cogging can be reduced.

In another embodiment, the length of the salient pole along the rotational axis is shorter than that of the rotor magnet, which allows a smoother transfer of the rotating magnetic field, reduced cogging and less electromagnetic noise.

In another embodiment, the rotational axis is slightly inclined and the rotor is stably supported by bearings at two points, thus making the rotation of the rotor smooth and reducing electromagnetic noise.

In another embodiment, even though the salient poles are expressed, a dust cover encloses the rotor magnet which prevents dust from entering the motor structure including the rotating parts.

What is claimed is:

1. A brushless DC motor, comprising:
   a rotor having a cylindrical rotor magnet supported rotationally by a shaft held by bearings mounted on a substantially planar base plate; and
   a stator attached to and supported by the base plate and opposed to said rotor magnet, and including a plurality of radially spaced salient poles holding stator coils formed by windings of magnet wire,
   wherein opposing surfaces of the rotor and each salient pole are defined by a first surface of a magnetic core of the salient pole, which is received in a bobbin, and a second surface of the magnetic core orthogonal to the first surface, and the rotor magnet has permanent magnet poles forming a first surface of the rotor magnet opposing the first surface of the magnetic core, and a second surface of the rotor magnet opposing the second surface of the magnetic core, and
   wherein a tip of each magnetic core is made of magnetic material and is received through a hole formed in the base plate.

2. A brushless DC motor according to claim 1,
   wherein said base plate is made from a soft magnetic material; and
   the tip of the magnetic core is magnetically connected to the base plate.

3. A brushless DC motor structure according to claim 2,
   wherein the tip of the magnetic core is punched to prevent the tip of the magnetic core from passing too far into the hole in the base plate.

4. A brushless DC motor structure according to claim 1,
   wherein a tip of the rotor shaft is at a same level as an uppermost surface of a turntable of the rotor.

5. A brushless DC motor structure according to claim 1,
   wherein a relationship between a thickness of laminations W of the salient poles, and a pole pitch P of a circumference of the rotor magnet is W=(0.4 to 0.7)P.

6. A brushless DC motor structure according to claim 1,
   wherein a length of a tip of one of the salient poles, which lies in a parallel plane to the rotor shaft, is less than a length of the permanent magnet in opposition thereto.

7. A brushless DC motor structure according to claim 1,
   wherein the first surface of each salient pole lies at an angle of two planes composed of a cylindrical plane at the heart of the rotor shaft and a horizontal plane orthogonal to the rotor shaft.

8. A brushless DC motor structure according to claim 1,
   wherein an outside of the salient poles fixed to the base plate is protected by a cover.

9. A brushless DC motor structure according to claim 1,
   wherein a tip of the rotor shaft projects above an uppermost surface of a turntable of the rotor.

* * * * *